United States Patent [19]
Berkowitz et al.

[11] Patent Number: 6,088,720
[45] Date of Patent: *Jul. 11, 2000

[54] SELF-CLEANING AND FORWARDING FEATURE FOR ELECTRONIC MAILBOXES

[75] Inventors: Patricia Ann Berkowitz, Little Silver; Robin Harris Foster, Monmouth County, both of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/902,443

[22] Filed: Jul. 29, 1997

[51] Int. Cl.$^7$ ................................................... G06F 15/16
[52] U.S. Cl. ........................ 709/206; 709/207; 709/219
[58] Field of Search ..................... 395/200.36, 200.37, 395/200.5; 345/339; 707/202; 709/206, 207, 219

[56] References Cited

U.S. PATENT DOCUMENTS

| | | | |
|---|---|---|---|
| 4,371,752 | 2/1983 | Matthews et al. | 709/206 |
| 5,586,036 | 12/1996 | Pintsov | 705/408 |
| 5,751,960 | 5/1998 | Matsunaga | 709/206 |
| 5,786,817 | 7/1998 | Sakano et al. | 345/339 |
| 5,787,247 | 7/1998 | Norin et al. | 395/200.5 |
| 5,805,298 | 9/1998 | Ho et al. | 358/402 |
| 5,832,514 | 11/1998 | Norin et al. | 707/202 |

OTHER PUBLICATIONS

Crocker, D.H., "Standard for the format of ARPA internet text messages," Dept. of Electrical Engineering, University of Delaware, Aug. 1982.

Howard Eglowstein and Tom Thompson, "Product focus," McGraw-Hill, Inc., E–mail; vol. 16, No. 3, p. 222, Mar. 1991.

IDG Communications, Inc., "Coordinator II," Info. World. Oct. 1990.

Postel, J. B., "Simple mail transfer protocol," Information Sciences Institute, University of Soythern California, Aug. 1982.

*Primary Examiner*—Zarni Maung
*Attorney, Agent, or Firm*—Gibbons, Del Deo, Dolan, Griffinger & Vecchione

[57] ABSTRACT

In a message communication system having electronic mailboxes, a method for self-cleaning of the electronic mailboxes comprises the steps of: identifying that a message is tagged for expiration; determining if the message has expired; and acting upon the message if said message has expired.

29 Claims, 2 Drawing Sheets

SELF-CLEANING AND FORWARDING FEATURE FOR ELECTRONIC MAILBOXES

FIELD OF THE INVENTION

This invention relates to the field of communications, and more particularly to communication systems having electronic mailboxes for messages.

BACKGROUND OF THE INVENTION

Because the Internet evolved from the ARPAnet, a research experiment that supported the exchange of data between government contractors and (often academic) researchers, an on-line culture developed that is alien to the corporate business world. The Internet was not designed to make commercialization easy.

Transaction Control Protocol/Internet Protocol (TCP/IP) is the communications standard between hosts on the Internet. TCP/IP defines the basic format of the digital data packets on the Internet allowing programs to exchange information with other hosts on the Internet.

Domain names direct where e-mail is sent, files are found, and computer resources are located. They are used when accessing information on the World Wide Web (WWW) or connecting to other computers through Telenet. Internet users enter the domain name, which is automatically converted to the Internet Protocol address by the Domain Name System (DNS). The DNS is a service provided by TCP/IP that translates the symbolic name into an IP address by looking up the domain name in a database.

E-mail was one of the first services developed on the Internet. Today, e-mail is an important service on any computer network, not just the Internet. E-mail involves sending a message from one computer account to another computer account. E-mail is used to send textual information as well as files, including graphic files, executable file, word processing and other files. E-mail is becoming a popular way to conduct business over long distances. Using e-mail to contact a business associate can be faster than using a voice telephone, because the recipient can read it at a convenient time, and the sender can include as much information as needed to explain the situation.

With the explosive growth of all forms of electronic messaging including e-mail, voice mail, stored fax, and stored video messages the volume of information has become enormous. Sorting through the various electronic messages is time consuming and can easily be overwhelming.

When a user is unable to access the electronic messages over an extended period of time, such as over a vacation, or an out of town business trip, their mailboxes become crammed. The messages may include information about a class or meeting, which is temporal in nature. Many of the accumulated messages are no longer of value, because the information has expired. Messages that still are relevant and of value may be lost in the enormous volume.

Accordingly, there is a need for providing automatic deletion of electronic messages after their useful life has expired.

SUMMARY OF THE INVENTION

A method for self-cleaning of electronic mailboxes in a message communication system. The method comprising the steps of: identifying that a message is tagged for expiration; determining if the message has expired; and acting upon the message if said message has expired.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Figure 1:
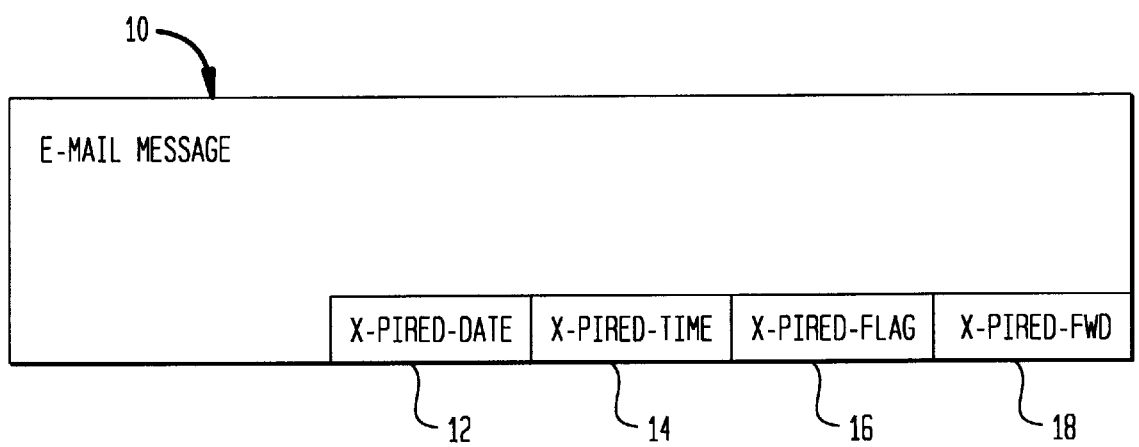
FIG. 1 is an overview an e-mail message.

Although the present invention is particularly well suited for use in connecting Internet users who are communicating with e-mail, such as those employing the Simple Mail Transfer Protocol (SMTP), and shall be described with respect to this application, the methods and apparatus disclosed here can be applied to other schemes employing electronic mailboxes for messages including voice mail, stored faxes and stored video. The present invention is equally well suited for use with e-mail systems which incorporate attachments such as word processing text, sound clips including WAV files, video clips including MPEG files, graphics, and other attachments.

SMTP was developed to provide for reliable and efficient transfer of e-mail between different communication environments. SMTP is independent of a particular transmission subsystem and requires only a reliable data stream channel. The ability to relay e-mail between different communication environments is an important feature.

A transport service provides an interprocess communication environment (ICPE). An ICPE may cover one network, span several networks, or a subset of a network. IPCEs are not one-to-one connections, but may communicate through another process, such as a mutually known IPCE. E-mail is a use of interprocess communications. E-mail can be communicated between processes in different IPCEs by relaying them through a process connecting two or more IPCEs. Therefore e-mail can be relayed between hosts on different transport systems by a host on both transport systems.

The interconnection between different systems requires a standard for the format of e-mail messages. One such standard is described in Internic RFC #822, entitled "Standard For The Format of ARPA Internet Text Messages" dated Aug. 13, 1982 (http://ds.internic.net/rfc/rfc822.txt), which is incorporated herein by reference. The fields that make up the message format include "Return-Path", "Received", "Date", "From", "Subject", "Sender", "To", "cc", etc. Two additional types of fields are of particular relevance, extension-fields and user-defined-fields. An extension-field is any field which is defined in a document published as a formal extension to the specification (none of which will have names beginning with the string "x-". A user-defined-field is any field which has not been defined in the specification or published as a formal extension to the specification. The names of the fields must be unique and may be pre-empted by published extensions (however a field beginning with the string "x-" will not be used as a formal extension and therefore will not be preempted).

The present invention self cleaning & forwarding feature for electronic mailboxes enables electronic mailboxes to delete from storage, mark as expired, sort by expiration date, suppress from view, or forward to additional parties electronic messages having an expiration date that has expired. The creator of the message sets the expiration date to correspond with a date and time at which the message is to be considered expired. The sender of the message can set the fields associated with these functions which allows the sender to have the message forwarded to one or more parties after some time interval.

Referring to FIG. 1 there is shown an e-mail message 10. For this exemplary embodiment we shall define the user-defined-fields of x-pired-date 12, x-pired-time 14 and x-pired-flag 16. The x-pired-flag 16 is used to indicate if the e-mail message 10 has an expiration associated with it. The x-pired-flag 16 can have a number of valid values. For this exemplary embodiment the values associated with the field are shown in table 1.

TABLE 1

| | |
|---|---|
| blank | no expiration date associated with message |
| 1 or greater | expiration date associated with message |
| 2 | suppress the expired message from viewing |
| 3 | delete the expired message |
| 4 | forward expired message |
| 5 | forward copy of expired message |

The values associated with the x-pired-flag 16 are used by an agent at the sender's e-mail system and the receiver's e-mail system for the appropriate handling of the e-mail message 10. When the x-pried-flag is set to the values of 4 or 5 the original e-mail message 10 or a copy will be forwarded after the expiration to the e-mail address or addresses that are contained in or referenced by x-pired-fwd 18.

Figure 2:
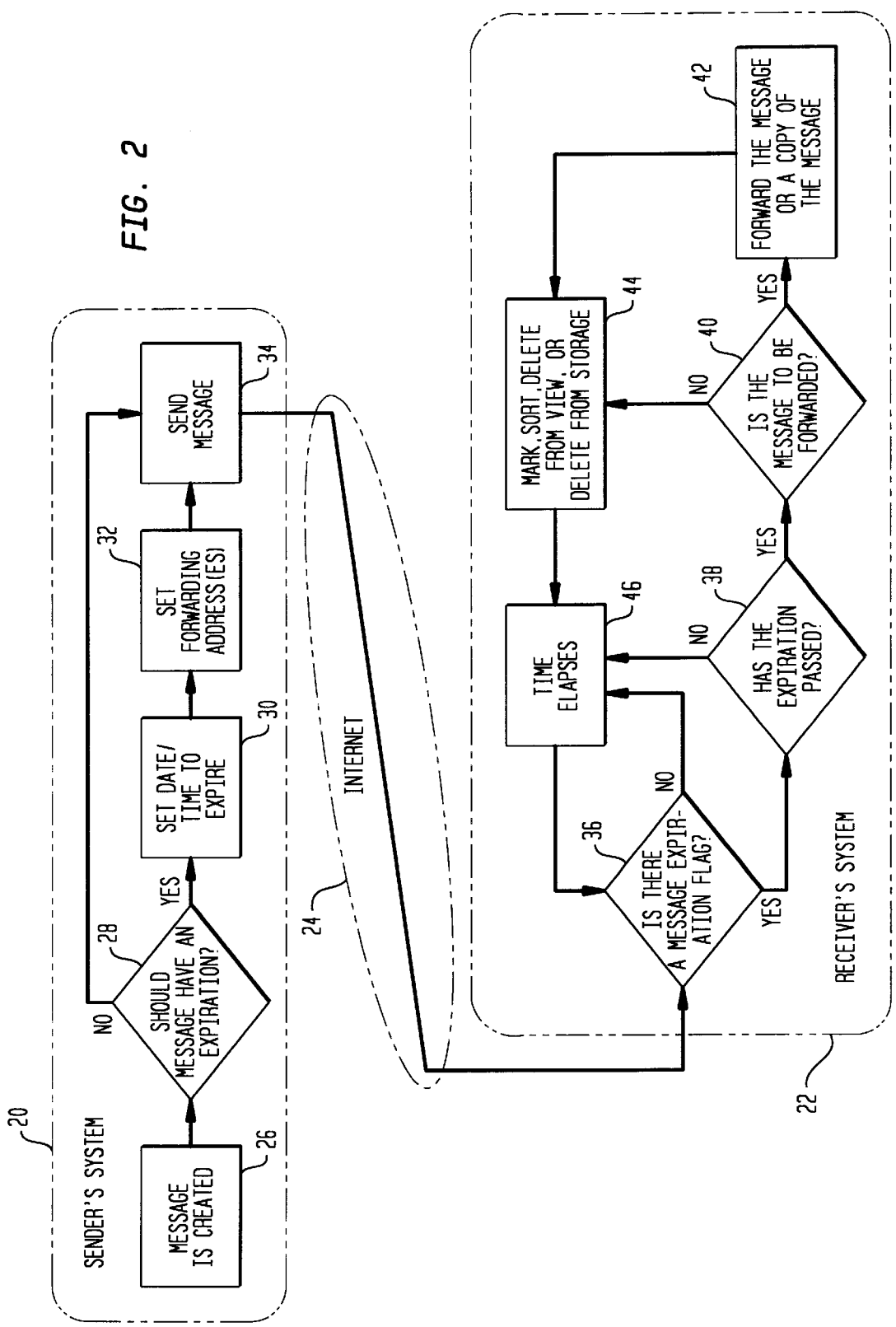
FIG. 2 is a high level flow chart of the self-cleaning electronic mailbox.

Referring to FIG. 2 there is shown a block diagram of the flow of the present invention self cleaning and forwarding feature for electronic mailboxes. An e-mail message 10 originates in a sender's system 20. Within the sender's system 20, the e-mail message 10 is created in step 26. In step 28 it is determined if the e-mail message 10 is to have an expiration. If there is an expiration associated with the e-mail message 10 then the user-defined-fields of x-pired-date 12, x-pired-time 14 and x-pired-flag 16 are assigned the appropriate values in step 30. If no expiration is associated then the x-pired-flag 16 remains blank. However if an expiration is associated then 1 or greater is assigned to the value of the x-pired-flag. If the x-pired-flag 16 was set to the value associated with forwarding upon expiration, which is 4 or 5 in this exemplary embodiment, then the forwarding e-mail address or addresses are assigned in step 32. It is possible to set the forwarding address to a reference which contains the address. This would allow the sender and recipient to use an alternative or secondary address without the requirement of actually entering or even knowing the address at the time that the e-mail message 10 is created as well as allow this address to vary during the life of the e-mail message 10. After step 32 or if there is no expiration associated with the e-mail message 10 as determined in step 28, then the e-mail message 10 is sent in step 34. The e-mail message 10 is sent through the Internet 24, or may be routed through or within a proprietary network, to reach a receiver's system 22. In step 36 the receiver's system 22 looks at the x-pired-flag 16 to determine if an expiration is associated with the e-mail message 10. If the x-pired-flag 16 is not blank then an expiration is associated with the e-mail message 10 and the process proceeds to step 38. In step 38 the expiration is checked to determine if it has passed, the x-pired-date 12, x-pired-time 14 field are compared with the current date and time or another predetermined date and time. If the expiration has not passed or if no expiration is associated with the e-mail message 10 then the process goes to step 46. Otherwise, if the expiration has passed, then the process goes to step 40 to determine if the e-mail message 10 is to be forwarded or a copy to be forwarded. If the x-pired-flag 16 is set to 4 or 5 for forwarding then the message is forwarded in step 42 to the e-mail address or addresses contained in or referenced by x-pired-fwd 18. The process now determines what action should be taken in step 44. In step 44, the action is dependent upon the x-pired-flag 16 as well as user predetermined options. In this exemplary embodiment, if the x-pired-flag 16 has the value of 2 then the e-mail message 10 is suppressed from view in the mailbox while if the x-pired-flag 16 has the value of 3 then the e-mail message 10 is deleted from storage. An x-pired-flag 16 having a value of 1 can be used to delay deletion from storage until the user exits the system. When the x-pired-flag 16 is set to 4 the original e-mail message 10 is forwarded to the e-mail address contained in or referenced by x-pired-fwd 18. When the x-pired-flag 16 is set to 5 a copy of the e-mail message 10 is forwarded to the e-mail address contained in or referenced by x-pired-fwd 18.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. In a message communication system having electronic mailboxes, a method of self-cleaning of the electronic mailboxes comprising the steps of:

identifying that a message is tagged for expiration, said expiration tag having a data field and a time field, wherein contents of said date field and said time field are variable and settable by a message creator;

determining if said message has expired; and acting upon said message if said message has expired; wherein said step of acting includes selectively forwarding said message if said message has expired and said message contains a field enabling selective forwarding to a destination identified by said message.

2. The method as recited in claim 1 further comprising the step of assigning an expiration indicator to said message.

3. The method as recited in claim 2 wherein said indicator comprises an action indicator.

4. The method as recited in claim 3 wherein the step of acting upon said message further comprises acting upon said message with an action corresponding to said action indicator.

5. The method as recited in claim 3 wherein said action indicator is selectively assigned a value corresponding to suppression of said message from viewing.

6. The method as recited in claim 3 wherein said action indicator is selectively assigned a value corresponding to automatic deletion of said message.

7. The method as recited in claim 3 wherein said action indicator is selectively assigned a value corresponding to automatic forwarding of said message.

8. The method as recited in claim 2 wherein said indicator comprises a temporal reference.

9. The method as recited in claim 1 wherein said message comprises an e-mail message.

10. The method as recited in claim 1 wherein said message comprises a voice mail message.

11. The method as recited in claim 1 wherein said message comprises a video mail message.

12. The method as recited in claim 1 wherein said message comprises a fax mail message.

13. The method as recited in claim 1 wherein the step of acting further comprising selectively deleting said message has expired and said message contains a field enabling selective deletion.

14. The method as recited in claim 1 wherein the step of acting includes selectively forwarding said message if said message has expired and said message contains a field enabling selective forwarding to a destination identified by said message, said destination is variable and settable by the message creator.

15. In a message communication system having electronic mailboxes, a method of self-cleaning of the electronic mailboxes comprising the steps of: tagging a message for expiration, said expiration tag having a date field and a time field, wherein contents of said date field and said time field are variable and settable by a message creator;

sending said message;

receiving said message;

identifying that said message is tagged for expiration;

determining if said message has expired; and acting upon said message if said message has expired; wherein said step of acting includes selectively forwarding said message if said message has expired and said message contains a field enabling selective forwarding to a destination identified by said message.

16. The method as recited in claim 15 further comprising the step of assigning an expiration indicator to said message before sending said message.

17. The method as recited in claim 16 wherein said indicator comprises an action indicator.

18. The method as recited in claim 16 wherein said indicator comprises a temporal reference.

19. The method as recited in claim 17 wherein the step of acting upon said message further comprises acting upon said message with an action corresponding to said action indicator.

20. The method as recited in claim 17 wherein said action indicator is selectively assigned a value corresponding to suppression of said message from viewing.

21. The method as recited in claim 17 wherein said action indicator is selectively assigned a value corresponding to automatic deletion of said message.

22. The method as recited in claim 17 wherein said action indicator is selectively assigned a value corresponding to automatic forwarding of said message.

23. The method as recited in claim 15 wherein said message comprises an e-mail message.

24. The method as recited in claim 15 wherein said message comprises a voice mail message.

25. The method as recited in claim 15 wherein said message comprises a video mail message.

26. The method as recited in claim 15 wherein said message comprises a fax mail message.

27. The method recited in claim 15 wherein the step of sending said message further comprises establishing communications over a digital packet network.

28. The method as recited in claim 15 wherein the step of acting further comprising selectively deleting said message if said message has expired and said message contains a field enabling selective deletion.

29. The method as recited in claim 15 wherein the step of acting includes selectively forwarding said message if said message has expired and said message contains a field enabling selective forwarding to a destination identified by said message, said destination is variable and settable by the message creator.

* * * * *